No. 710,378. Patented Sept. 30, 1902.
L. C. SWEET.
FURROW OPENING AND COVERING ATTACHMENT FOR SEED DRILLS.
(Application filed Mar. 15, 1902.)
(No Model.)
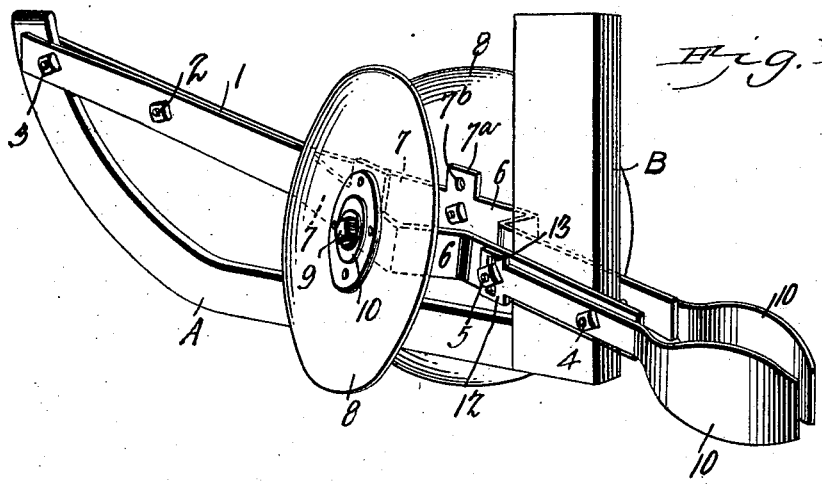
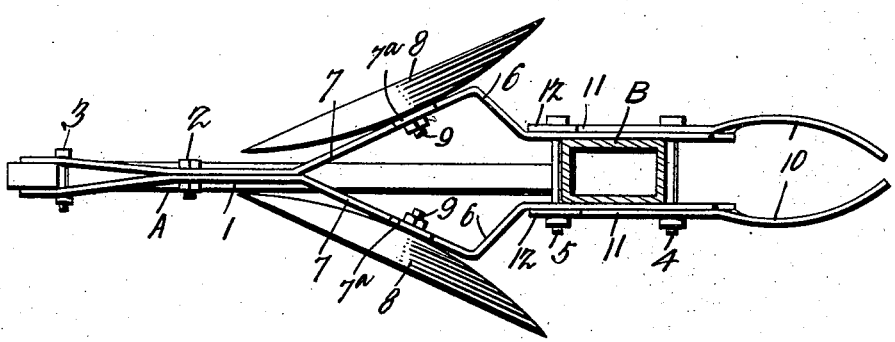
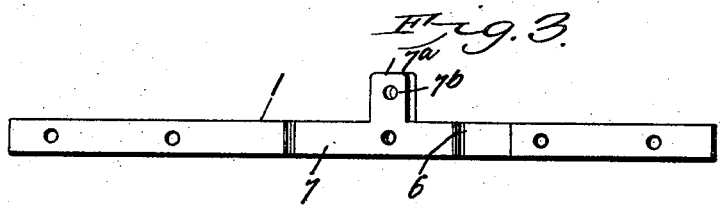
Witnesses
L. C. Sweet, Inventor.
by Attorneys

UNITED STATES PATENT OFFICE.

LARNTINE C. SWEET, OF LOAMI, ILLINOIS.

FURROW OPENING AND COVERING ATTACHMENT FOR SEED-DRILLS.

SPECIFICATION forming part of Letters Patent No. 710,378, dated September 30, 1902.

Application filed March 15, 1902. Serial No. 98,413. (No model.)

*To all whom it may concern:*

Be it known that I, LARNTINE C. SWEET, a citizen of the United States, residing at Loami, in the county of Sangamon and State of Illinois, have invented a new and useful Furrow Opening and Covering Attachment for Seed-Drills, of which the following is a specification.

My invention is an improved attachment for the runner and seed-spout of a planter by means of which seeds may be planted at any desired uniform depth and covered either in the furrow or at about the surface of the soil; and my invention consists in the peculiar construction and combination of devices hereinafter fully set forth and claimed.

In the accompanying drawings, Figure 1 is a perspective view of the seed-spout and runner of a planter provided with my improved attachments. Fig. 2 is partly a top plan view and partly a sectional view of the same. Fig. 3 is a detail side elevation of one of the supporting-bars which carry the disks.

In the embodiment of my invention I provide a pair of supporting-bars 1, which are secured together at a suitable distance from their front ends, as by a bolt 2. The front ends of the supporting-bars are adapted to be clamped to opposite sides of the upturned front portion of the shoe or runner A of a planter by means of a bolt 3. The rear end portions of the bars 1 are disposed against opposite sides of the seed-spout B of the planter and are secured thereto and clamped thereon by bolts 4 5, which are disposed, respectively, on the rear and front sides of the seed-spout. The said bars 1 are provided at a suitable distance in advance of the seed-spout with lateral offsets 6, which extend outwardly therefrom and form forwardly-converging portions 7, to which the disks 8 are attached by means of bolt-spindles 9, the said spindles being journaled in the hub portions 10 of the disks, so that the latter may rotate on said bolt-spindles. The said disks are thus disposed with their outer sides converging forwardly and on opposite sides of the shoe or runner A and are here shown as concavo-convex in cross-section. In practice the said disks may be disposed with either the concave or their convex sides outermost, according to whether or not it is desired to open furrows for the reception of the seeds. When it is desired to open such furrows, the concaved sides of the disks are disposed outermost, as shown in Fig. 2; otherwise the convex sides of the disks will be disposed outermost, in which event the disks will operate on the surface of the soil, not penetrating the same to any material extent and not opening a furrow therein, but simply acting to slightly stir the soil at and near its surface to prepare and freshen the seed beds or rows and to destroy such weeds and grasses as may be germinating and sprouting therein. It will be understood that by loosening the nuts on the bolts 4 5 the rear ends of the bars 1 may be adjusted vertically on the seed-spout. By tightening the said nuts when the bars have been thus adjusted the same may be reclamped to the seed-spout, as will be understood. The same may be done at the front end of the bars, owing to the provision of the clamping-bolt 3. I also provide for the vertical adjustment of the disks with relation to the supporting-bars 1 by forming said bars at the obliquely-disposed portions 7 thereof with upstanding arms $7^a$. The said bars and the said upstanding arms are provided with adjusting-openings $7^b$, arranged in vertical series, for the reception of the spindle-bolts 9.

In Figs. 1 and 2 of the drawings I show coverers 10, which may be either of the construction here shown or of any other suitable construction and are provided with forwardly-extending arms 11, which bear on the outer sides of the rear portions of the bars 1 and are secured thereto by the bolts 4 5. The former bolt forms a pivot for the arms 11 and adapts the coverers to be vertically adjusted as may be necessary in the operation of the planter to cover the seeds to any desired extent, and the front ends of the arms 11 of the coverers have enlarged head portions 12, which are provided with adjusting-slots 13, in which the bolt 5 is disposed. It will be understood that by this construction and combination of devices the coverers may be secured at any desired adjustment. Under certain conditions the use of the coverers may not be necessary, in which event the coverers may be readily detached from the supporting-bars 1.

My improved furrow opening and covering attachments may be used in connection with planters for planting corn, cotton, or other varieties of seeds and either on the surface of the soil or in furrows of any desired depth. When the attachment is adjusted for opening comparatively deep furrows and covering the seeds therein, the same adapts the planter for use as a lister. It will be furthermore understood that my improved attachment is exceedingly cheap and simple, is thoroughly efficient in operation, and may be used in connection with the runner and seed-spout of any common cotton, corn, or similar planter without alteration thereof and that it may be readily attached to and detached from the same.

Having thus described my invention, I claim—

1. In combination with the runner and seed-tube of a planter, bars having means to clamp their front and rear ends to the runner and seed-tube respectively, disks carried by said bars and means to vertically adjust the disks thereon, substantially as described.

2. In combination with the runner and seed-tube of a planter, bars having means to clamp their front and rear ends to the runner and seed-tube, respectively, and disks carried by said bars, substantially as described.

3. In combination with the runner and seed-tube of a planter, bars having means to clamp their front and rear ends to the runner and seed-tube, respectively, and disks and coverers carried by said bars, and disposed respectively in advance and rear of the seed-tube, substantially as described.

4. In combination with the runner and seed-tube of a planter, bars having means to clamp their front and rear ends to the runner and seed-tube respectively, disks carried by said bars in advance of the seed-tube and coverers disposed in rear of the seed-tube and having forwardly-extending arms attached to the bars, substantially as described.

5. In combination with the runner and seed-tube of a planter, bars having means to clamp their front and rear ends to the runner and seed-tube respectively, disks carried by said bars in advance of the seed-tube and coverers disposed in rear of the seed-tube and having forwardly-extending arms pivotally connected to the bars so that the coverers may be vertically adjusted, and means to clamp said arms to said bars to secure the coverers when adjusted, substantially as described.

In testimony that I claim the foregoing as my own I have hereto affixed my signature in the presence of two witnesses.

LARNTINE C. SWEET.

Witnesses:
 HUBBARD C. FOSTER,
 WM. G. MILLER.